(12) United States Patent
Weinblatt

(10) Patent No.: US 8,464,310 B2
(45) Date of Patent: Jun. 11, 2013

(54) INTERACTIVE TV

(76) Inventor: Lee S. Weinblatt, Teaneck, NJ (US)

( * ) Notice: Subject to any disclaimer, the term of this patent is extended or adjusted under 35 U.S.C. 154(b) by 353 days.

(21) Appl. No.: 11/711,519

(22) Filed: Feb. 27, 2007

(65) Prior Publication Data

US 2007/0277212 A1    Nov. 29, 2007

Related U.S. Application Data

(60) Provisional application No. 60/777,426, filed on Feb. 27, 2006.

(51) Int. Cl.
*H04N 7/16* (2011.01)

(52) U.S. Cl.
USPC .............................................. 725/135; 725/23

(58) Field of Classification Search
USPC ........................................................ 725/135
See application file for complete search history.

(56) References Cited

U.S. PATENT DOCUMENTS

| | | | |
|---|---|---|---|
| 5,285,278 A * | 2/1994 | Holman | 725/23 |
| 5,287,181 A * | 2/1994 | Holman | 348/473 |
| 2003/0022622 A1 * | 1/2003 | Weinblatt et al. | 455/3.06 |
| 2003/0144035 A1 * | 7/2003 | Weinblatt et al. | 455/566 |

* cited by examiner

*Primary Examiner* — Brian Pendleton
*Assistant Examiner* — Jean D Sant Cyr
(74) *Attorney, Agent, or Firm* — Cozen O'Connor

(57) ABSTRACT

A technique for providing interactive television viewing. A programming signal is combined with a code signal to form a transmission signal, wherein different programming signals correspond to respective code signals. The technique includes broadcasting the transmission signal, receiving the broadcast transmission signal with a TV receiver at a viewer's location, and displaying the programming signal in the received transmission signal. At least one code signal is pre-stored at the viewer's location. Interactive program data is also pre-stored at the viewer's location, wherein different interactive program data correspond to respective ones of the pre-stored code signals. The technique further includes detecting the code signal in the received transmission signal, determining whether the detected code signal matches the pre-stored code signal and, if so, inputting to a display the pre-stored interactive program data that corresponds to the detected code signal, displaying to the viewer the interactive program data that corresponds to the detected code signal, and recording a viewer response signal that has been manually inputted, interactively with the displayed programming signal, based on the displayed interactive program data.

30 Claims, 1 Drawing Sheet

INTERACTIVE TV

RELATED APPLICATION

This application claims priority from U.S. Provisional Patent Application Ser. No. 60/777,426 filed on Feb. 27, 2006. The content of which is hereby incorporated herein by reference.

FIELD OF THE INVENTION

This invention is directed to a technique for providing interactive television viewing and, more particularly, to methods, apparatus, a system and devices that provide interactive viewing to a much wider audience than currently possible.

BACKGROUND OF THE INVENTION

Interactive television ("TV" hereafter) enables television viewers to both receive broadcast signals so they can be displayed on their own TV screen and also to send signals back to the broadcast source that are associated in some way with the program being shown. This two-way transmission capability is highly desirable to enhance viewing enjoyment as well as for other purposes involving educational, marketing, surveying, and other activities. Interactivity is possible with cable because of its two-way transmission capacity. However, programs supplied via cable involve a limited audience and require specialized equipment which incurs additional costs both to the broadcasters and the viewers. Interactive television is not available for viewers who receive the programs via an antenna or through satellite transmission because these have only a one-way capability.

SUMMARY OF THE INVENTION

It is an object of this invention to make interactive television available to a much wider audience of people and at lower cost than is currently possible via cable.

This and other objects are attained in accordance with one aspect of the invention directed to a method for providing interactive television viewing, comprising the steps of combining a programming signal with a code signal to form a transmission signal, wherein different programming signals correspond to respective code signals; broadcasting the transmission signal; receiving the broadcast transmission signal with a TV receiver at a viewer's location, and displaying the programming signal in the received transmission signal; pre-storing at the viewer's location at least one code signal; pre-storing at the viewer's location interactive program data, wherein different interactive program data correspond to respective ones of said pre-stored code signals; detecting the code signal in the received transmission signal; determining whether the detected code signal matches the pre-stored code signal and, if so, inputting to a display the pre-stored interactive program data that corresponds to the detected code signal; displaying to the viewer the interactive program data that corresponds to the detected code signal; and recording a viewer response signal that has been manually inputted, interactively with the displayed programming signal, based on the displayed interactive program data.

Another aspect of the invention is directed to a method for providing interactive television viewing with broadcast transmission signal received with a TV receiver at a viewer's location, which displays the programming signal in the received transmission signal, wherein the transmission signal is a combination of a programming signal with a code signal, with different programming signals corresponding to respective code signals, wherein the method comprises the steps of pre-storing at the viewer's location at least one code signal; pre-storing at the viewer's location interactive program data, wherein different interactive program data correspond to respective ones of said pre-stored code signals; detecting the code signal in the received transmission signal; determining whether the detected code signal matches the pre-stored code signal and, if so, inputting to a display the pre-stored interactive program data that corresponds to the detected code signal; displaying to the viewer the interactive program data that corresponds to the detected code signal; and recording, interactively with the displayed programming signal, a viewer response signal that has been manually inputted based on the displayed interactive program data.

Yet another aspect of the invention is directed to an apparatus for providing interactive television viewing, comprising means for combining a programming signal with a code signal to form a transmission signal, wherein different programming signals correspond to respective code signals; means for broadcasting the transmission signal; means for receiving the broadcast transmission signal with a TV receiver at a viewer's location, and displaying the programming signal in the received transmission signal; means for pre-storing at the viewer's location at least one code signal; means for pre-storing at the viewer's location interactive program data, wherein different interactive program data correspond to respective ones of said pre-stored code signals; means for detecting the code signal in the received transmission signal; means for determining whether the detected code signal matches the pre-stored code signal and, if so, inputting to a display the pre-stored interactive program data that corresponds to the detected code signal; means for displaying to the viewer the interactive program data that corresponds to the detected code signal; and means for recording, interactively with the displayed programming signal, a viewer response signal that has been manually inputted based on the displayed interactive program data.

Another aspect of the present invention is directed to an apparatus for providing interactive television viewing with broadcast transmission signal received with a TV receiver at a viewer's location, which displays the programming signal in the received transmission signal, wherein the transmission signal is a combination of a programming signal with a code signal, with different programming signals corresponding to respective code signals, wherein the apparatus comprises means for pre-storing at the viewer's location at least one code signal; means for pre-storing at the viewer's location interactive program data, wherein different interactive program data correspond to respective ones of said pre-stored code signals; means for detecting the code signal in the received transmission signal; means for determining whether the detected code signal matches the pre-stored code signal and, if so, inputting to a display the pre-stored interactive program data that corresponds to the detected code signal; means for displaying to the viewer the interactive program data that corresponds to the detected code signal; and means for recording, interactively with the displayed programming signal, a viewer response signal that has been manually inputted based on the displayed interactive program data.

Another aspect of the present invention is directed to a system for providing interactive television viewing, comprising a remote device that stores interactive program data corresponding to specific codes and is at a viewer's location; a television receiver at a viewer's location and including circuitry for detecting a code signal in a broadcast transmission signal, said detected code signal being provided to the remote device; a display for generating an image corresponding to the detected code signal and interactive program data associated therewith; and an input device on the remote device for enabling the viewer to interactively perform manual input of viewer response relative to the image being displayed.

Another aspect of the present invention is directed to a remote device for an interactive system, comprising memory means for storing at least the interactive program data, and input data entered manually by a viewer; a code sensor for detecting a code signal located within a broadcast transmission signal; an input device for enabling the viewer to perform manual input data selection; and a display for generating images that correspond to the detected code signal and whichever of the interactive program data is associated therewith.

DETAILED DESCRIPTION OF THE DRAWINGS

Figure 1:
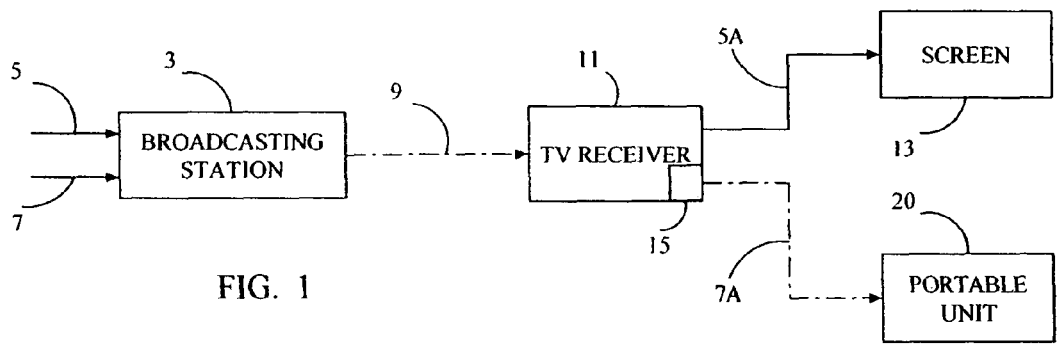
FIG. 1 is a general schematic block diagram of an embodiment of the invention showing a broadcasting station which generates a transmission signal that can be picked up by television receivers in the homes of the viewing audience, and a portable unit that provides an interactive TV capability.

FIG. 1 shows a broadcasting station 3 that receives a programming signal 5 and a code signal 7 which it combines to form transmission signal 9. The transmission signal 9 is emitted by broadcasting station 3 to a viewing audience within a reception range of the broadcasting station. TV receivers 11 within the reception range pick up transmission signal 9. The TV receiver 11 includes circuitry that separates programming signal 5 from the transmission signal 9 to produce corresponding programming signal 5A which is inputted to TV screen 13. The program is thus shown on TV screen 13.

Figure 2:
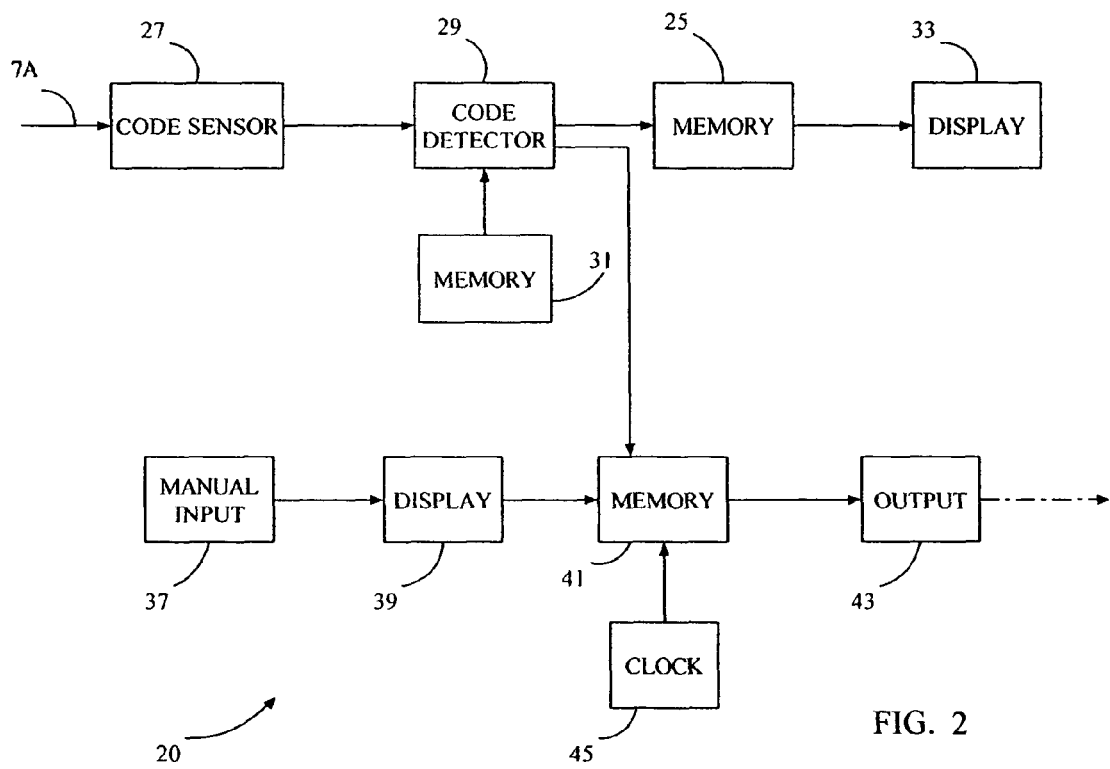
FIG. 2 is a schematic block diagram showing greater detail of the portable unit that can be used in accordance with the invention to provide interactive TV capability.

TV receiver 11 also separates code signal 7 from the received transmission signal 9 to produce code signal 7A. The received code signal 7A is inputted to a portable unit 20, the details of which are shown in FIG. 2. The received code signal 7A can be inputted from TV receiver 11 to portable unit 20 via a direct line connection, through acoustic transmission from the speaker 15 to a microphone, through RF or IR transmission, or by other means.

Signals 5A and 7A can be the same as, respectively, signals 5 and 7 or a related but somewhat modified version, such as due to amplification or digitization at the TV receiver 11.

Turning now to FIG. 2, portable unit 20 includes a memory 25 for storing interactive program data. More details on such data are provided below. Suffice it to say at this point that such data is inputted into memory 25 before the television program, with which such data is to be used interactively, is broadcast. Thus, when such television program is broadcast by broadcasting station 3, the interactive program data is already stored in portable unit 20 and ready for use in a manner explained below.

Portable unit 20 includes a code sensor 27 which detects the received code signal 7A provided by TV receiver 11. Such code sensor 27 can be a microphone for acoustic transmission, an antenna for RF transmission, or a light sensor for IR transmission, for example. In any case, the code sensor 27 provides its output to a code detector 29. Code detector 29 determines whether or not the received code matches any of the codes stored in code memory 31. If a match is found, then the received code 7A is inputted to memory 25. In response to the received code, memory 25 selects the interactive program data which uniquely corresponds to that received code, as is further explained below, and inputs the interactive program data to display 33 which provides a corresponding image to the viewer.

Returning now to details of the interactive program data stored in memory 25, if the television program currently being watched is a quiz show, for example, then the interactive program data can be a set of answers to questions that are being asked on the quiz show. Each question is assigned a certain number of possible answers. When that question is asked while the quiz show is being shown on TV screen 13, a particular code 7 that was combined with programming signal 5 for such question within transmission signal 9 is simultaneously received with such question by TV receiver 11 and is inputted as signal 7A to portable unit 20. Thus, that detected code 7A is passed through sensor 27 and detector 29 to retrieve the corresponding set of answers from the data stored in memory 25. That retrieved set of answers is shown on display 33.

Returning now to the depiction of portable unit 20 in FIG. 2, it includes a manual input device 37 to enable the viewer to select one of the answers in the set shown on display 33. Input device 37 can be an alphanumeric keyboard, a cursor control to control a cursor appearing on display 33 combined with a select key, or any other device with the above-described capability to select one of the answers shown on display 33. The selection corresponding to the manual input is shown on display unit 39. With the availability of display unit 39, the viewer can confirm that his selection has been properly inputted. Display unit 39 can be the same as or a just portion of display 33. Also, in some circumstances a confirmation of the viewer selection may not be necessary in which case the need for having display unit 39 is reduced or even eliminated. In any case, whatever selection the viewer has made is inputted to memory device 41. This memory device 41 stores all the answers selected by the viewer during the course of a certain period of time, such as one day. The stored data is then provided via an output means 43 to a a remote processing center (not shown) for analyzing the data and taking whatever action may be appropriate for the particular circumstances involved. In the case of a quiz show, for example, if the viewer's answer is correct, then the viewer may be eligible for a prize. Output means 43 can be any one of several well known devices for transmitting the stored data in memory 41 to the remote processing center, such as via the Internet, phone lines or RF transmission. The transmission can be set for a preset time, at preset time intervals from each other, or in response to a trigger signal sent by the remote processing center.

Memory 41 also can store a time signal from a real time clock 45 and/or the code signal from decoder 29. Either one or both of these signals provides synchronization with the program as it is displayed on TV screen 13 so that the remote processing center can associate the viewer's manual input with what the viewer was watching at any given moment. More specifically, the synchronization can be based on time. Thus, let us take as a given that the time of day during which a particular question was asked on the quiz show is already known. If the time of day from clock 45 is recorded along with the viewer's answer in memory 41, then the two times can be compared and the comparison reveals a relationship between the question as it was being asked and the answer as it was selected in response thereto by the viewer. An alternative approach is to record the detected code signal in memory 41. A particular question can be associated with a unique code signal. Thus, by storing the code signal together with the viewer's selected answer it is possible to determine the question to which the viewer was responding. Of course, other synchronization techniques are well known ad can readily be adapted by a person with ordinary skill in the art for use with the present invention.

The interactive program data can be inputted to memory 25 in any one of a variety of well known ways. The same is true of the codes preset into memory 31. Examples are a direct wire link to a PC, such as from a phone line, transmission over the Internet, or RF transmission.

As explained above, the data stored in memory 25 is stored in such a way that it can be retrieved in response to a specific code signal 7A. How this can be done is well known to anyone with ordinary skill in the art, so details are not deemed necessary.

Although the example of a quiz show has been given, the viewer can be responding to survey questions, to questions presented on an educational program, or the viewer can be watching a sports program and is asked to predict the winner.

It is clear that this invention can be used with a practically unlimited number of applications involving such interactivity.

In the above-described embodiment, the viewer is shown responding to the interactive program data being shown on display 33. Thus, in the example discussed above, display 33 of portable unit 20 shows the set of answers corresponding to the question being then asked during the quiz show. However, one alternative embodiment is to display such questions on a portion of the screen of display 13 of TV receiver 11, thus dispensing with the need for using a display 33 for this particular function. In another alternative embodiment, it is possible for the host of the quiz show to give the set of possible answers verbally. In case of such alternative embodiments, portable unit 20 is used only for recording the viewer's answers. Those are stored in memory 41 and then eventually provided to the remote processing center.

Another alternative embodiment is to incorporate components 25, 27, 29, 31, 41, 43 and 45 in TV receiver 11, with screen 13 serving as displays 33, 39. Portable unit 20 will retain manual input 37.

A further alternative embodiment is to incorporate some of the components 25, 27, 29, 31, 41, 43 and 45 in TV receiver 11, and the remaining ones being incorporated in portable unit 20. Thus, communication between TV receiver 11 and portable unit 20 will involve more than just signal 7A. In fact, perhaps signal 7A will not be transmitted at all to portable unit 20, such as if code sensor 27, code detector 29, memory 31 and memory 25 are incorporated into TV receiver 11, in which case such communicated signal will be the interactive program data to be shown on display 33.

Although the description provided above discusses details of embodiments of the invention, it is clear that various changes and alternatives thereto would readily occur to a person with ordinary skill in the art. All such changes are intended to fall within the scope of the present invention as defined by the following claims.

I claim:

1. A method for providing interactive television viewing, comprising the steps of:
   combining a programming signal with a code signal to form a transmission signal, wherein different programming signals correspond to respective code signals;
   broadcasting the transmission signal;
   receiving the broadcast transmission signal with a TV receiver at a viewer's location, and displaying the programming signal in the received transmission signal;
   pre-storing at the viewer's location at least one code signal;
   pre-storing at the viewer's location interactive program data, wherein different interactive program data correspond to respective ones of said pre-stored code signals;
   detecting the code signal in the received transmission signal;
   determining whether the detected code signal matches the pre-stored code signal and, if so, inputting to a display the pre-stored interactive program data that corresponds to the detected code signal;
   displaying to the viewer the interactive program data that corresponds to the detected code signal; and
   recording a viewer response signal that has been manually inputted, interactively with the displayed programming signal, during the display of the programming signal based on the displayed interactive program data.

2. The method of claim 1, wherein the at least one code signal is pre-stored in a portable unit at the viewer's location.

3. The method of claim 2, wherein the interactive program data is pre-stored in the portable unit at the viewer's location.

4. The method of claim 3, wherein the viewer response signal is stored in the portable unit at the viewer's location.

5. The method of claim 4, wherein the interactive program data is displayed on the portable unit at the viewer's location.

6. The method of claim 5, wherein the viewer response signal is stored in the portable unit at the viewer's location in association with the detected code signal.

7. The method of claim 6, wherein the viewer response signal is stored in the portable unit at the viewer's location in association with a time signal.

8. The method of claim 1, wherein the interactive program data is pre-stored in a portable unit at the viewer's location.

9. The method of claim 1, wherein the viewer response signal is stored in a portable unit at the viewer's location.

10. The method of claim 1, wherein the interactive program data is displayed on a portable unit at the viewer's location.

11. The method of claim 1, wherein the viewer response signal is stored in a portable unit at the viewer's location in association with the detected code signal.

12. The method of claim 1, wherein the viewer response signal is stored in a portable unit at the viewer's location in association with a time signal.

13. The method of claim 1, wherein the viewer response signal is transmitted to a remote processing center.

14. A method for providing interactive television viewing with broadcast transmission signal received with a TV receiver at a viewer's location, which displays the programming signal in the received transmission signal, wherein the transmission signal is a combination of a programming signal with a code signal, with different programming signals corresponding to respective code signals, wherein the method comprises the steps of:
   pre-storing at the viewer's location at least one code signal;
   pre-storing at the viewer's location interactive program data, wherein different interactive program data correspond to respective ones of said pre-stored code signals;
   detecting the code signal in the received transmission signal;
   determining whether the detected code signal matches the pre-stored code signal and, if so, inputting to a display the pre-stored interactive program data that corresponds to the detected code signal;
   displaying to the viewer the interactive program data that corresponds to the detected code signal; and
   recording, interactively with the displayed programming signal, a viewer response signal that has been manually inputted during the display of the programming signal based on the displayed interactive program data.

15. The method of claim 14, wherein the at least one code signal is pre-stored in a portable unit at the viewer's location.

16. The method of claim 14, wherein the interactive program data is pre-stored in the portable unit at the viewer's location.

17. The method of claim 14, wherein the viewer response signal is stored in the portable unit at the viewer's location.

18. The method of claim 14, wherein the interactive program data is displayed on the portable unit at the viewer's location.

19. The method of claim 14, wherein the viewer response signal is stored in the portable unit at the viewer's location in association with the detected code signal.

20. The method of claim 14, wherein the viewer response signal is stored in the portable unit at the viewer's location in association with a time signal.

21. The method of claim 14, wherein the viewer response signal is transmitted to a remote processing center.

22. Apparatus for providing interactive television viewing, comprising:
    a combining unit configured to combine a programming signal with a code signal to form a transmission signal, wherein different programming signals correspond to respective code signals;
    a broadcasting unit configured to broadcast the transmission signal;
    a receiving unit configured to receive the broadcast transmission signal with a TV receiver at a viewer's location, and displaying the programming signal in the received transmission signal;
    a first pre-storing unit configured to pre-store at the viewer's location at least one code signal;
    a second pre-storing unit configured to pre-store at the viewer's location interactive program data, wherein different interactive program data correspond to respective ones of said pre-stored code signals;
    a detecting unit configured to detect the code signal in the received transmission signal;
    a determining unit configured to determine whether the detected code signal matches the pre-stored code signal and, if so, inputting to a display the pre-stored interactive program data that corresponds to the detected code signal;
    a display unit configured to display to the viewer the interactive program data that corresponds to the detected code signal; and
    a recording unit configured to record, interactively with the displayed programming signal, a viewer response signal that has been manually inputted during the display of the programming signal based on the displayed interactive program data.

23. An apparatus for providing interactive television viewing with broadcast transmission signal received with a TV receiver at a viewer's location, which displays the programming signal in the received transmission signal, wherein the transmission signal is a combination of a programming signal with a code signal, with different programming signals corresponding to respective code signals, wherein the apparatus comprises:
    a first pre-storing unit configured to pre-store at the viewer's location at least one code signal;
    a second pre-storing unit configured to pre-store at the viewer's location interactive program data, wherein different interactive program data correspond to respective ones of said pre-stored code signals;
    a detecting unit configured to detect the code signal in the received transmission signal;
    a determining unit configured to determine whether the detected code signal matches the pre-stored code signal and, if so, inputting to a display the pre-stored interactive program data that corresponds to the detected code signal;
    a display unit configured to display to the viewer the interactive program data that corresponds to the detected code signal; and
    a recording unit configured to record, interactively with the displayed programming signal, a viewer response signal that has been manually inputted during the display of the programming signal based on the displayed interactive program data.

24. A system for providing interactive television viewing, comprising:
    a remote device that stores interactive program data corresponding to specific codes and is at a viewer's location;
    a television receiver at a viewer's location and including circuitry for detecting a code signal in a broadcast transmission signal, said detected code signal being provided to the remote device;
    a display for generating an image corresponding to the detected code signal and interactive program data associated therewith;
    an input device on the remote device for enabling the viewer to interactively perform manual input of viewer response during broadcast of the broadcast transmission signal relative to the image being displayed based on the interactive program data; and
    a recording unit configured to record, interactively with the displayed image, a viewer response signal that has been manually inputted on the input device during display of the image based on the interactive program data.

25. The system of claim 24, wherein the remote device comprises:
    a code sensor configured to detect the code signal in the broadcast transmission signal;
    a memory configured to store at least interactive program data, a code signal, and the input from the viewer; and
    said display.

26. A remote device for an interactive system, comprising:
    a memory configured to store at least the interactive program data, and input data entered manually by a viewer;
    a code sensor configured to detect a code signal located within a broadcast transmission signal;
    an input device configured to enable the viewer to perform manual input data selection;
    a display configured to generate images that correspond to the detected code signal and whichever of the interactive program data is associated therewith, wherein the input device enables the viewer to perform the manual input data selection during broadcast of the broadcast transmission signal based on the display of the images that correspond to the detected code signal and whichever of the interactive program data is associated therewith; and
    a recording unit configured to record, interactively with the displayed image, a viewer response signal that has been manually inputted on the input device during display of an image based on the interactive program data.

27. The remote device of claim 26, wherein the code sensor comprises one of a microphone, an antenna and a light sensor.

28. The remote device of claim 26, wherein the remote device is a portable device.

29. The method of claim 26, wherein the broadcast transmission signal comprises a television program.

30. The method of claim 1, further comprising:
storing the viewer response signal in the portable unit at the viewer's location in association with a time signal indicating a time at which the viewer response signal was recorded; and
comparing the time signal associated with the viewer response signal to another time signal associated with at least one of the displayed programming signal and the detected code signal to associate the viewer response signal with the displayed programming signal.

* * * * *